United States Patent

Robbins et al.

[15] 3,697,876

[45] Oct. 10, 1972

[54] ANTENNA SELF-TEST SYSTEMS

[72] Inventors: Robert Robbins, Hudson; Arthur R. Whitty, Hollis; Louis J. Kachavos, Derry, all of N.H.

[73] Assignee: Sanders Associates, Inc., Nashua, N.H.

[22] Filed: Oct. 17, 1969

[21] Appl. No.: 867,245

[52] U.S. Cl. .....................325/67, 325/133, 325/363
[51] Int. Cl. ............................H04b 1/16, H04b 1/04
[58] Field of Search .......325/67, 133, 363; 343/17.7, 343/703

[56] References Cited

UNITED STATES PATENTS 3,149,284   9/1964   Kishinsky .................325/67

*Primary Examiner*—Robert L. Griffin
*Assistant Examiner*—Kenneth W. Weinstein
*Attorney*—Louis Etlinger

[57] ABSTRACT

An antenna system is provided, in which a small test probe positioned in the antenna cavity is coupled to a system self-test unit. A signal, designed to exercise the primary functions of the system under evaluation is transmitted between the antenna and the test probe and then conducted to the actual system or the self-test unit for processing. This signal activates the appropriate system which is then evaluated for actual performance.

4 Claims, 8 Drawing Figures

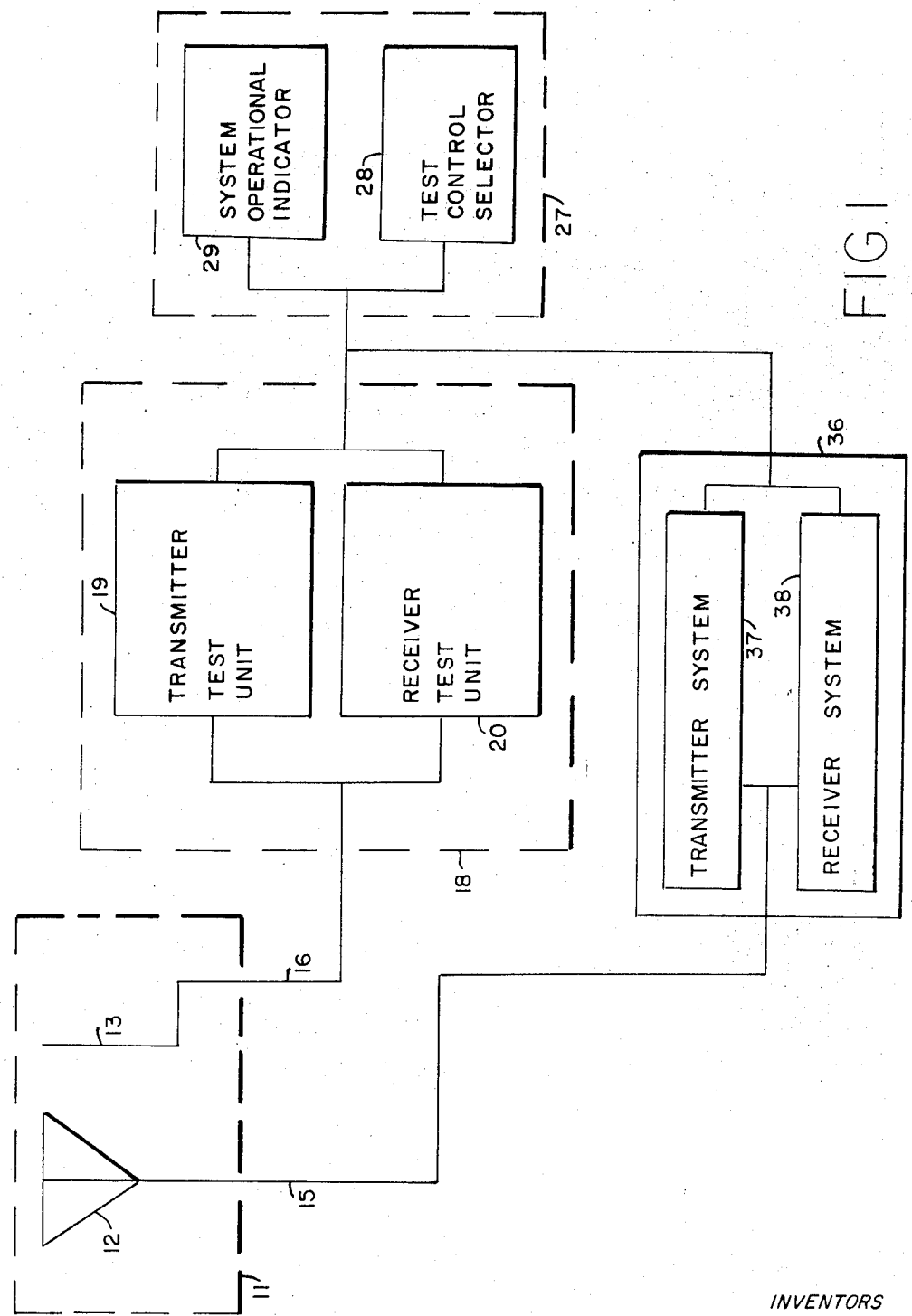
FIG. 1
INVENTORS
ROBERT ROBBINS
ARTHUR R. WHITTY
LOUIS J. KACHAVOS
ATTORNEY

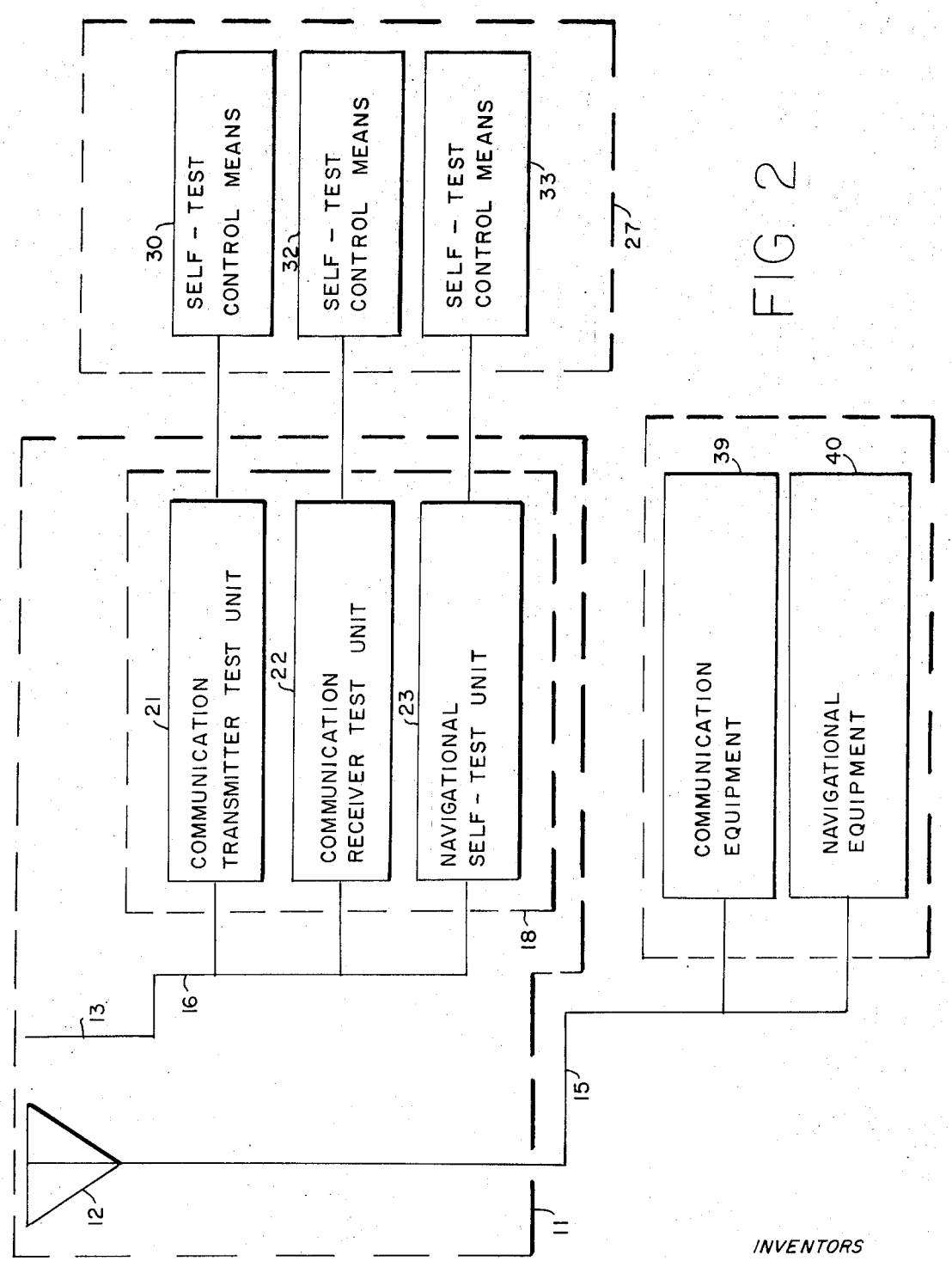

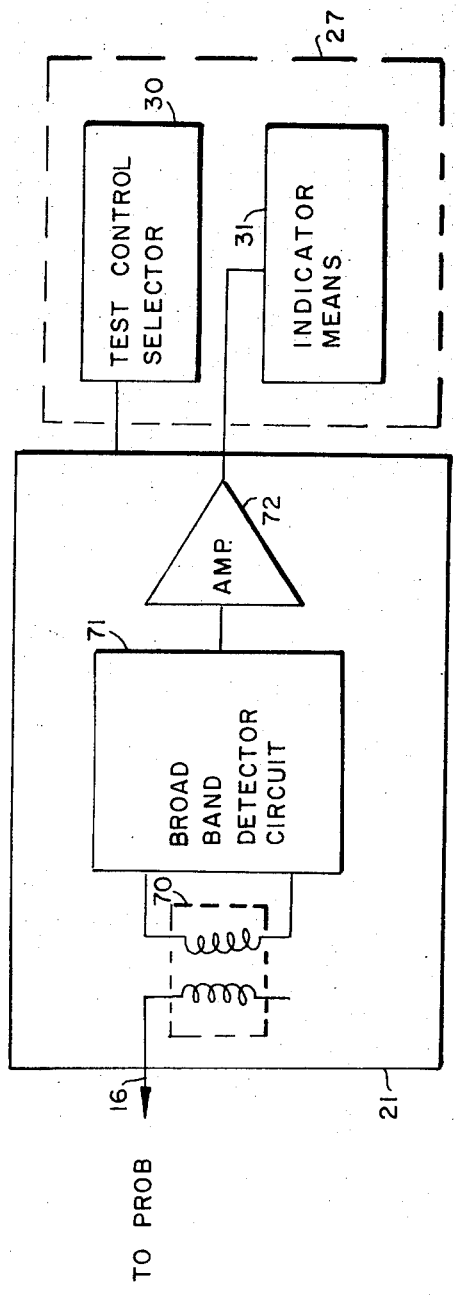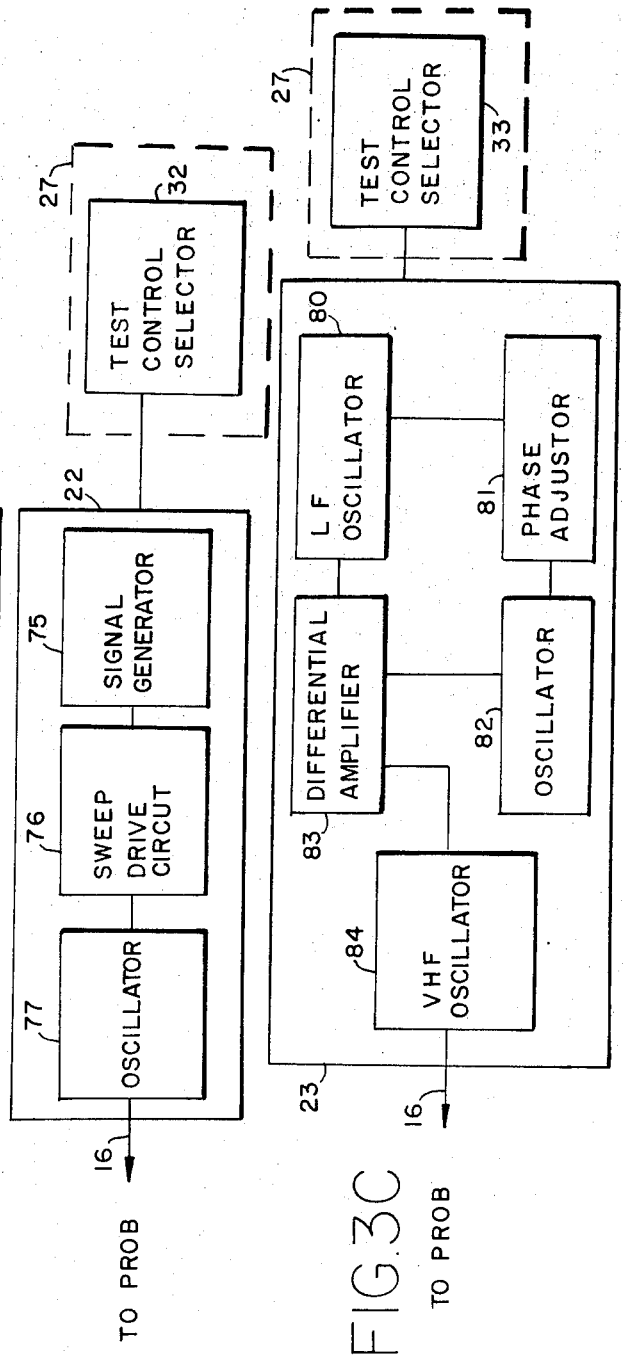

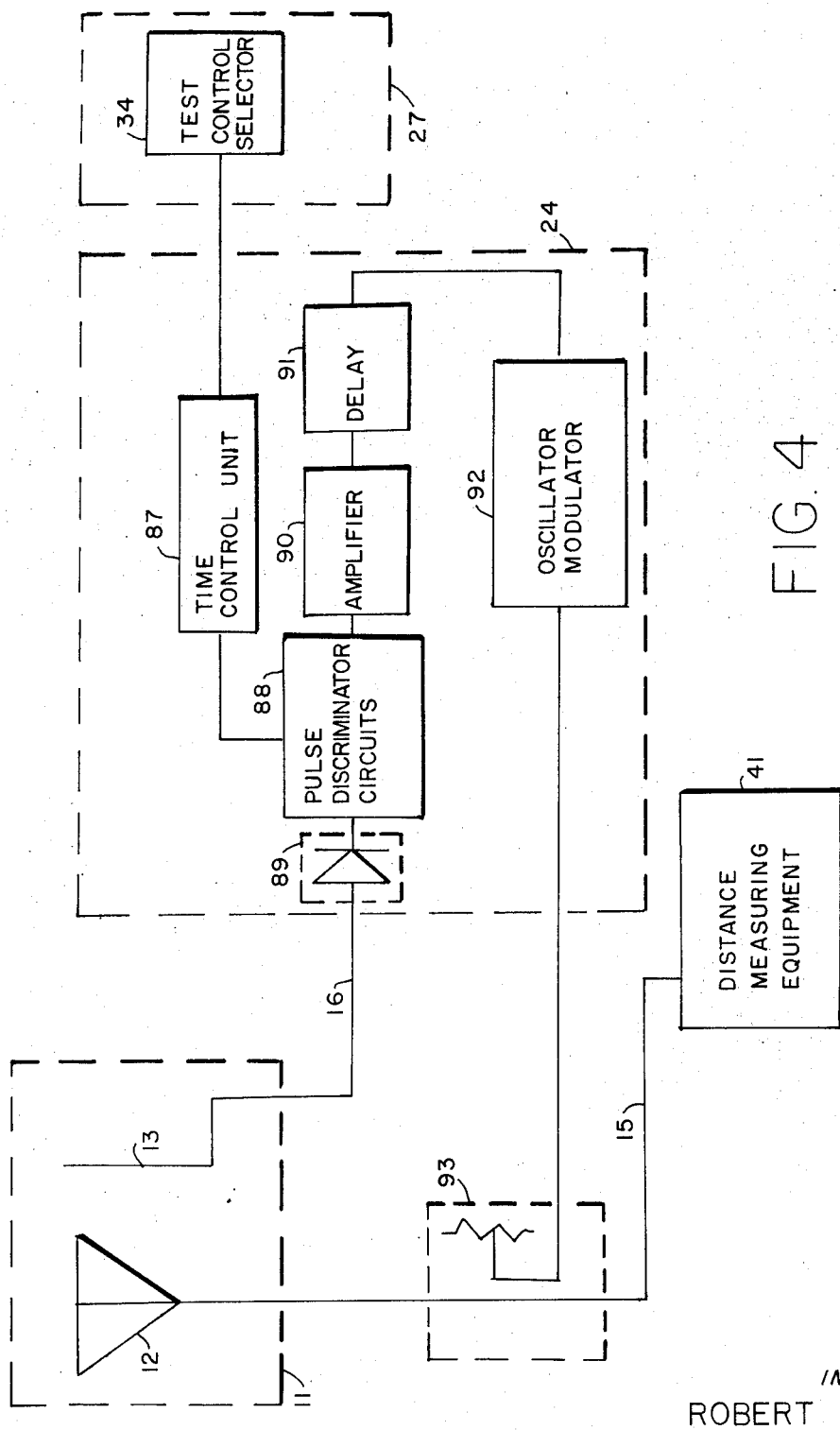
FIG. 4
INVENTORS
ROBERT ROBBINS
ARTHUR R. WHITTY
LOUIS J. KACHAVOS
ATTORNEY

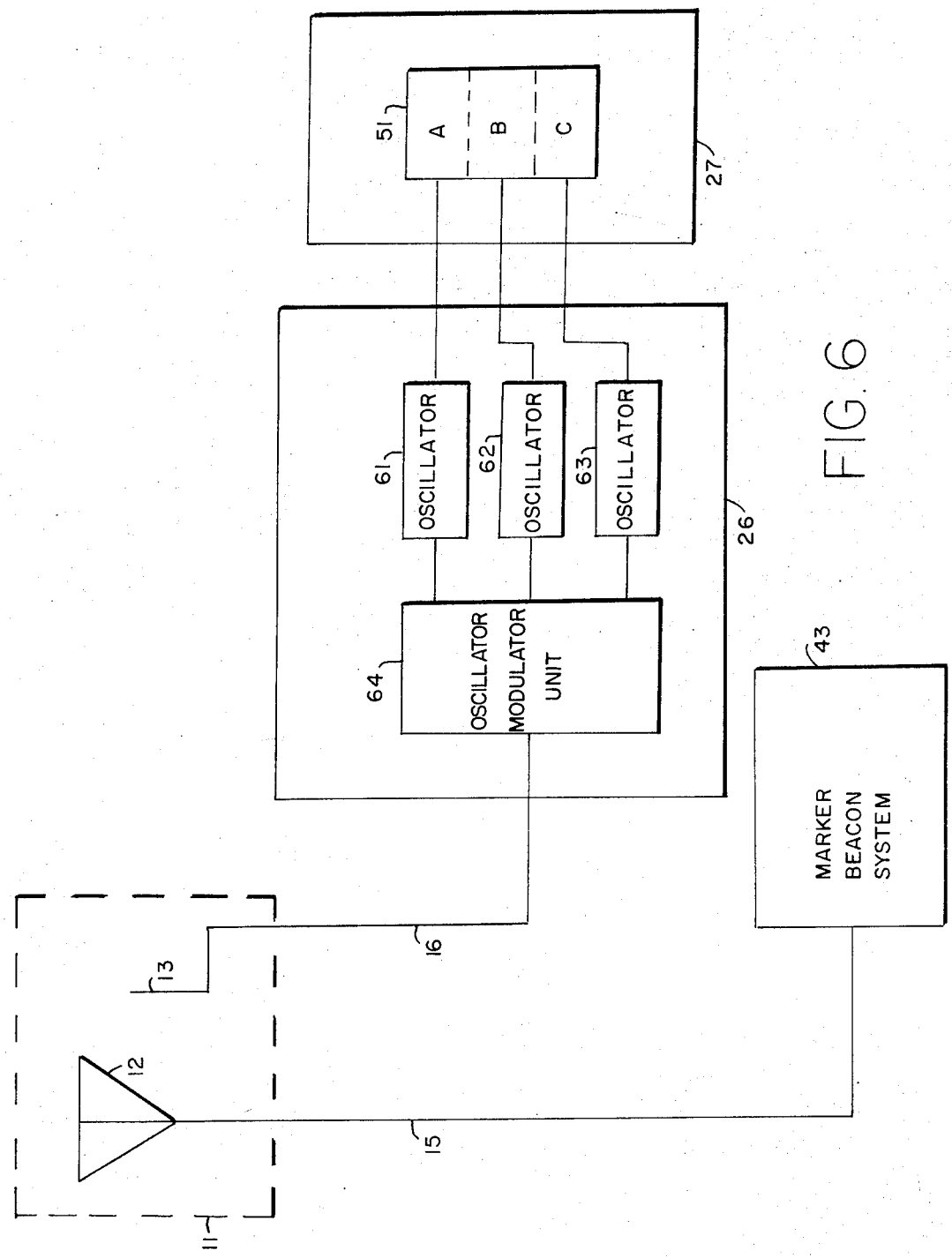
FIG. 6
INVENTORS
ROBERT ROBBINS
ARTHUR R. WHITTY
LOUIS J. KACHAVOS
BY 
ATTORNEY

ANTENNA SELF-TEST SYSTEMS

FIELD OF THE INVENTION

The present invention relates to electronic systems and their associated self-test units, more particularly, to self-test units designed to evaluate the performance of an antenna, its interconnecting cables, and the associated electrical components.

PRIOR ART

In the field of airborne electronic systems, more particularly, the system comprising the antenna interconnecting cables, and electrical components, it is recognized that it is extremely difficult, if not impossible to test these units while the aircraft is in actual flight. For example, some systems such as navigational or VOR equipment can be tested in flight by tuning the receiver to receive special test signals transmitted at preselected ground stations. However, only a limited number of test stations are strategically located in the United States for reasons such as cost, and these are in or near the major airway lanes. Since many aircraft operate in other areas, these test centers are not available to all aircraft.

Other airborne electronic systems provide self-test features in only the electrical equipment. In particular, these self-test features only provide the means to test the electronic component section of the system, and not the total system which includes the antenna and interconnecting cable paths.

Further, the function of some electronic systems in certain aircraft is classified, such as for security reasons. For example, the function of certain electronic systems in military aircraft must necessarily be secret and therefore classified. In these instances, it is impossible to provide ground test stations, and the available electronic self-test systems do not satisfy the requirements of determining the operational status of the total electronic system.

An alternative available solution is to use ground support test equipment, similar in design and function to the self-test features used in the airborne equipment test procedures. The equipment used in these procedures provides a system of signals designed to check out the function of the particular electronic systems. However, similar to the above-described airborne self-test features, only the active electronic components of the system are evaluated for system performance since the test signals are inserted through electrical connections provided in the surface of the airplane. Thus the antenna and interconnecting cable runs are not used or evaluated in these tests. Further, there is no way to check out or evaluate the total electronic system after the airplane is airborne.

SUMMARY OF THE INVENTION

Accordingly, it is a primary object of this invention to provide a novel and improved test system;

An additional object of this invention is to provide an antenna system in which a test probe is contained within the antenna cavity;

It is a further object of this invention to provide a system self-test unit which is capable of producing test signals which will exercise the primary functions of the total airborne electronic systems;

A further object of this invention is to transmit the simulated test signal from the test probe to the system antenna, and then to the system which is to be evaluated for operational status;

Another important object of this invention is to provide a system self-test unit which will evaluate the operational effectiveness of the antenna, the interconnecting cables and the electronic systems while the airplane is in flight.

According to this invention, this and other objects which will become apparent upon reading the specification are embodied in apparatus comprising an antenna system which includes a test probe within the antenna cavity, the test probe is capable of transmitting to or receiving from the main system antenna a signal which will exercise the primary functions of the electronics system. The signal activates the system to be evaluated and the response of the interrogated system is then evaluated for performance.

BRIEF DESCRIPTION OF THE DRAWINGS

For a clearer understanding of the invention, reference may be made to the following detailed description and accompanying drawings, in which:

FIG. 1 is a schematic representation of the operational electronic system to be evaluated and its associated self-test unit and antenna test probe;

FIG. 2 is a schematic representation of the communications and navigational systems and the associated self-test unit and antenna test probe;

FIGS. 3A, B and C are schematic representations of the component units which comprise the self-test units of FIG. 2;

FIG. 4 is a schematic representation of the distance measuring equipment and its associated self-test system;

FIG. 6 is a schematic representation of the beacon marker equipment and its associated self-test system.

DETAILED DESCRIPTION OF THE PREFERRED EMBODIMENTS

Figure 5:
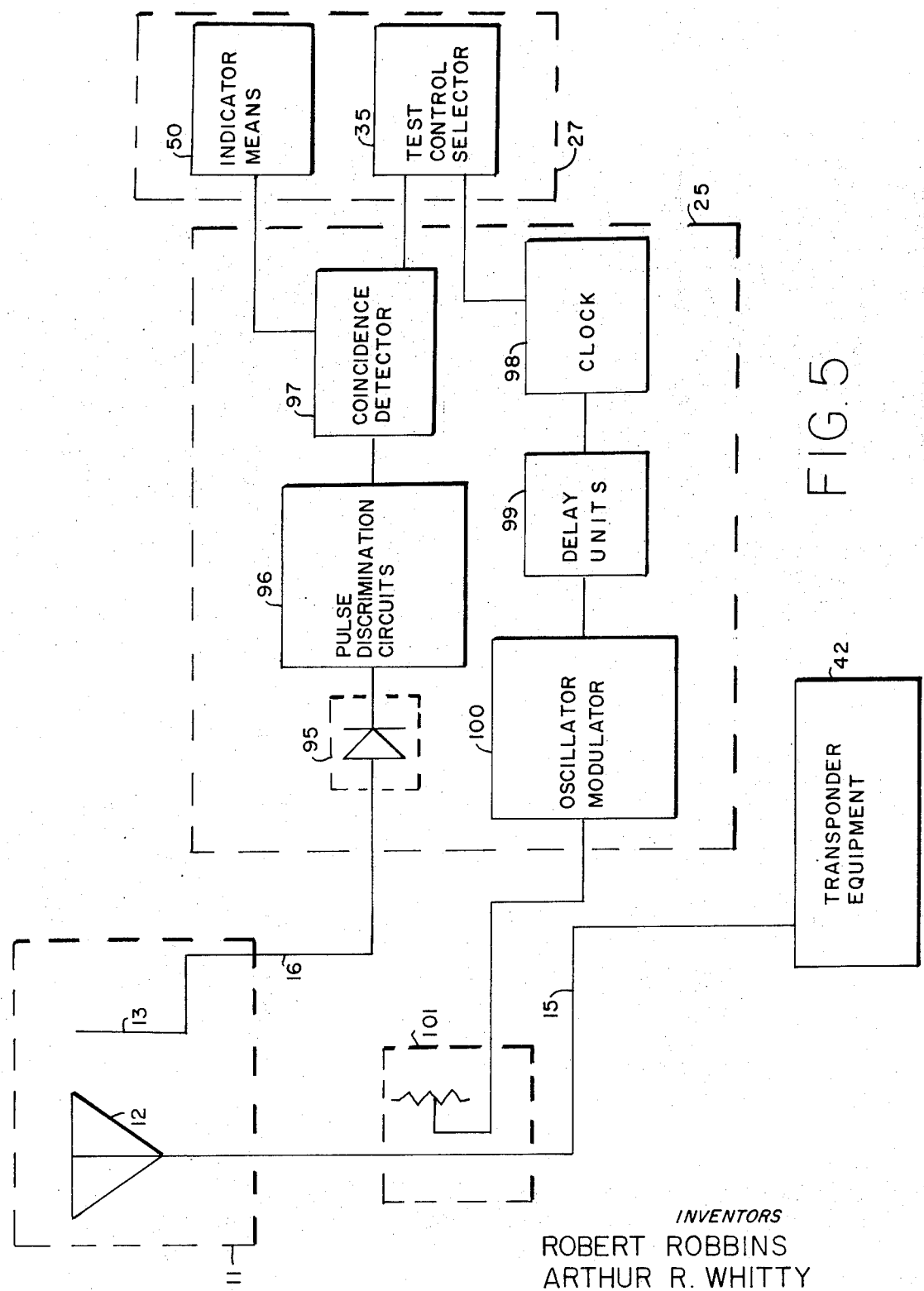
FIG. 5 is a schematic representation of the transponder equipment and its associated self-test system.

An operational system embodying the invention is illustrated in FIGS. 1, 2, 4, 5, and 6 and includes the operational electronics system being evaluated 36, an antenna compartment 11 including an antenna 12 and an antenna test probe 13, a self-test unit 18 and a local control unit 27. When a test control selector 28 is energized, a simulated, operational signal which will exercise the primary functions of the airborne electronics is transmitted between the antenna 12 and the antenna test probe 13, that is, the signal is radiated from one of the antennas. This signal is then conducted by conducting wire 16 or 15 to be processed in either the self-test unit 18 or the operational system 36 respectively and evaluated. If the total system performs satisfactorily, more particularly, the antenna 12, the system 36 and the interconnecting conducting wire 15, an appropriate signal indicating system performance is transmitted to an indicator 29 on the test control console.

It is one of the key objectives of this invention to permit the pilot to test the operation of a complete system while he is in actual flight. Thus, an operational signal, actual or simulated, must be transmitted from or received at the system antenna 12. More particularly, when the transmitter system 37 is being tested, an actual system signal is conducted through conducting wire 15 to antenna 12 transmitted and received at test probe 13, and then processed by the transmitter test unit 19. Alternatively, when the receiver unit 38 is to be tested, antenna 12 receives a simulated signal from test probe 13. The simulated signal generated in receiver test unit 20 is conducted through conducting wire 16 to probe 13. This simulated signal is processed by receiver unit 38 and the results thereof are evaluated.

An important feature of this invention is the proximity of antenna 12 and antenna test probe 13. More particularly, the antennas are positioned so that a signal transmitted from one antenna will be received at the other antenna, that is, they are in each others radiation pattern. In the system described in this specification, a flush mount antenna system, antenna 12 and test probe 13 are positioned within the antenna compartment 11 or cavity. This system, however, may also be used with external mounted antenna systems. The only criteria being the need for the close proximity of the antenna 12 and its antenna test probe 13. Furthermore, self-test unit 18 may also be physically located within the antenna compartment 11, as well as elsewhere within the aircraft structure.

The antenna test probe 13 is any device that is capable of transmitting and receiving a signal. In effect it is an antenna having sufficient sensitivity to transmit and receive an intelligible signal.

In describing the operation of the preferred system, the operation of the transmitter self-test system will first be discussed. Normally, the airborne electronics system 36 is functioning at all times and the system self-test unit 18 is energized whenever the system 36 is to be tested. Thus, in order to test and evaluate transmitter unit 37 of the system 36, it is necessary to transmit from antenna 12 a signal generated by transmitter unit 37. At the same time, test control selector 28 is energized and thereby permitting a signal being received at test probe 13 to be processed by the transmitter test unit 19. If the appropriate transmitted signal is detected and processed by transmitter test unit 19, a signal is displayed at systems operational indicator 29. Conversely, if an incorrect signal is being transmitted from antenna 12, then no signal is given at system indicator unit 29.

To test the receiver portion of the unit under test, receiver unit 38, test control selector 28 is switched on thereby energizing receiver test unit 20. Receiver test unit 20 generates a test signal which is designed to test the primary functions of receiver unit 38; that is, this simulated signal is equivalent to the signal normally received and processed by receiver unit 38. Also, this signal may be designed so that receiver unit 38 will respond in a predetermined manner; such as to emit an audible tone or cause a predetermined meter indication or reading. This signal is conducted by conducting wire 16 to test probe 13; transmitted to antenna 12 and conducted to and processed by receiver unit 38. If the predetermined result is detected, the pilot then knows that this particular system is functioning properly.

The system indicator 29, illustrated in FIG. 1, is connected to both the operational test system 36 and the self-test unit 18. In the examples set forth in the specification, the system indicator 29 associated with the receiver unit 38 is the indicator within the receiving unit that is used during actual system operation; such as, a speaker unit for the communication system, a range meter in the distance measuring equipment or lights in the marker beacon system. The system indicator 29 associated with the transmitter test unit is any indicating device interconnected with test unit 19; such as, an audible sound device, a light source or a calibrated meter. In effect, system indicator 29 is a go-no-go device, and may be designed to give a signal for either an operational or non-operational system.

The test control selector 28, illustrated in FIG. 1, is connected to both the operational test system 36 and the self-test unit 18. In the system actually constructed in accordance with the principles of this invention, test control selector 28 is only interconnected with and energizes self-test unit 18. System 36 is made operational for test purposes in the same manner as when the system is in actual use. Further, the local control unit 27, as constructed, comprises a test selector 28 for each self-test unit. However, other types of control units may be used, for example, a multiposition switch used in conjunction with a test selector 28. In this example, the switch is positioned to test a particular system, activation of test selector 28 will energize self-test unit 18. In this manner, a common test selector 28 is shared between all of the self-test systems.

The power level of the simulated test signal, through proper design techniques, is only sufficient to be received by antenna 12 and processed by the equipment in system 36. Conversely, the power level of the signal is insufficient to be transmitted into free space and be detected so as to activate any corresponding equipment at other places.

An important design consideration is the effective isolation of the self-test unit 18 and the test probe 13 so that they will not be rendered inoperative by the high RF transmitter power emitted from antenna 12.

In a specific embodiment of the invention, illustrated in FIGS. 2 and 3A–3C, the self-test system 18 is designed to test the navigational 40 and communication 39 equipment in the aircraft. The communication 39 and navigational 40 equipment being the conventional equipment that is available in the commercial market.

The communication equipment 39 contains both a transmitter and a receiver section, with both sections to be tested on an individual basis. The communications transmitter test unit 21, illustrated in FIG. 2 and FIG. 3A, comprises a coupling circuit 70, a broadband detector circuit 71, an amplifier 72 and an indicator means 31 such as a light, a meter or other signaling device.

To test the transmitter section of the communication equipment 39 the pilot places the transmitter section of equipment 39 in the transmit mode and places the test control selector means 30 in the test mode, thereby energizing the transmitter test unit 21. A normal system signal, in particular, the *rf* carrier signal, is then conducted from the transmitter section through conducting wire 15 to the antenna 12, and transmitted into free space. The transmitted signal is then received by the test probe 13 and conducted through conducting wire 16 to the transmitter test unit 21. The received signal is then coupled through coupling network 70 to the broadband detector circuit 71. The detected signal is amplified in amplifier 72 and transmitted to indicator means 31 at the local control unit 27. Indicator means 31 may be any device which will produce a detectable signal in response to a signal from amplifier 72, such as a light or a meter. The meter may be calibrated to indicate the signal strength of the transmitted signal. If the transmitted section of the communications unit 39 is not operating properly, the test unit 21 will not process a proper signal, and indicator means 31 will not be energized.

The receiver test unit 22 section of the communications unit 39, illustrated in FIGS. 2 and 3B, includes a signal generator 75 a sweep driver circuit 76 and a sweep oscillator unit 77.

To test the receiver section of the communications system 39, the pilot places the receiver test control selector 32 in the test mode, and the receiver section of system 39 in the receive mode. Upon energization of receiver test unit 22, the signal generator 75 applies a low frequency signal to sweep driver circuit 76. The output of the sweep driver circuit 76 is designed to vary at an audio rate, such as 1 KHz. The output of the sweep circuit 76 modulates the signal developed in oscillator unit 77, and the output signal of the oscillator unit 77 then varies between two predetermined frequencies. The output signal is conducted to test probe 13 through conducting wire 16. The range of this swept frequency signal transmitted signal is set to encompass all frequency bands in which the communications receiver may be tuned. If the total receiver section of the communications system is operating properly, an audio tone will be generated as the swept frequency passes through the particular frequency band in which the communications receiver is tuned. Conversely, if no audio tone is present, the system is not operating satisfactorily.

The navigational self-test unit 23, illustrated in FIGS. 2 and 3C comprises a low frequency oscillator 80, a phase adjuster 81, an oscillator 82, a differential amplifier 83 and a VHF oscillator 84.

To test the navigational equipment 40, the self-test control means 33 is placed in the test position thereby energizing the self-test unit 23. The self-test unit 23 may be designed to give any reading on the navigational (VOR) indicator, such as zero or 180°. When the self-test unit 23 is energized, two signals are generated, a first signal being supplied by LF oscillator 80, set at 30Hz, and a second signal in oscillator 82, set for 9960 Hz. The first signal, 80, modulates the second signal produced by oscillator 82 after passing through phase adjuster 81. In this particular instance, phase adjuster 81 varies the phase of the signal from oscillator 82 so that it has a certain phase relationship with the first signal generated in LF oscillator 80 to produce a desired reading on the VOR indicator. The frequency modulated signal from oscillator 82 is applied to one input terminal of differential amplifier 83 and a second signal from oscillator 80 is applied to the other input terminal of amplifier 83. Phase network 81 shifts the phase of the first low frequency signal so that the modulated output signal from oscillator 82 is either in phase (0°) or out of phase (180°) with the first low frequency signal appearing at the input of amplifier 83. The signal of the VHF oscillator is then frequency modulated by the combined or mixed signal from amplifier 83, and the resultant signal is conducted through conducting wire 16 to test probe 13. Navigational antenna 12 then receives the signal transmitted from probe 13 which is then conducted to and processed by the navigational equipment 40. As previously stated, the navigational self-test unit may be designed so that either a 0° or a 180° indication is produced on the navigational (VOR) indicator. Then any deviation from these readings would indicate the amount of error in the indicator system or the navigational (VOR) system.

A third specific embodiment of this invention, illustrated in FIG. 4, is the self-test system for the distance measuring equipment 41 (hereinafter referred to as DME). The self-test system comprises a DME self-test unit 24, a test control selector 34, and coupling element 93 for coupling a simulated signal onto conductor 15 which causes the airborne DME 41 to provide a predetermined indication.

The DME self-test unit 24 comprises an rf detector unit 89, pulse discriminator circuits 88, an amplifier 90, a delay line unit 91, an oscillator-modulator circuit 92, and a time control unit 87.

In actual operation the airborne unit transmits a two-pulse group signal to a fixed ground station. Each pair of signals received at a ground station is detected, amplified and then delayed for an accurately calibrated period. The delayed signal thereafter triggers a modulator circuit transmitting a pulse group back to the airplane, and indicating circuits within the DME 41 detect and measure the transit time of the pulse groups thereby providing an indication of distance from the ground station. The DME self-test unit 14 is designed to operate in a similar manner and provide pulses that indicate a predetermined distance.

When the DME test control selector 34 is placed in the test position, time control unit 87 is energized for a preselected length of time, and which simultaneously energizes the pulse discriminator circuits 88 for a corresponding length of time. During this time period, the transmitter unit of the DME 41 supplies *rf* power containing groups of pulse-pair signals to antenna 12. The transmitted groups of pulse-pair signals are received by test probe 13, coupled to and detected within detector unit 89, and then applied to the pulse discriminator circuits 88. If, and only if, both pulse pairs are present and separated by a predetermined given pulse length will the pulse discriminator circuit 88 couple the signal containing the pulse pair to amplifier circuit 90. Amplifier circuit 90 reconstructs the pulse pair signal and applies them to delay line unit 91. After a calibrated length of time the pulse-pair of signals modulate a high frequency signal developed in oscillation unit 92. This modulated signal is then coupled to conducting wire 15 through coupling unit 93 and applied to the receiver circuit of the DME 41. The receiver portion of the DME 41 detects and measures the time lapse of the transmitted pulse-pair signals and provides a signal to give an indication on the DME range meter. As previously stated, the reading on the DME range meter is determined by the length of time delay within unit 91. It is thus seen that the DME self-test unit performs a system check on the entire avionic system in the airplane; that is, the DME 41, conducting cable 15 and its couplings and the DME antenna 12.

A fourth specific embodiment of this invention, illustrated in FIG. 5, is the self-test system for the transponder equipment 42, and comprises a self-test unit 25, a local control unit 27, an antenna test probe 13, and a signal coupling network 101. The self-test unit 25 is designed to simulate the operation performed by a ground station; that is, by applying an interrogating signal to the transponder equipment and then analyzing the signals that are retransmitted by the transponder equipment 42.

To test the transponder equipment 42, the test control selector 35 is placed in the test position, and power is applied to the transponder self-test unit 25. Initially, a clock circuit 98 applies a series of regulated pulses to a delay unit 99. The delay unit 99 is designed to arrange this series of pulses into a train of pulses according to a predetermined code. The signals from the delay line 99 are applied to oscillator unit 100 to modulate the signal developed therein. The modulated output signal from oscillator unit 100 is then coupled to conducting line 15 through coupling circuit 101. This modulated signal is then received at and processed in the receiver portion of the transponder equipment 42. The coupling circuit 101 is designed to isolate the antenna 12 from any signal generated in the self-test unit 25, and to direct all signals to the transponder equipment 42. Therefore, the simulated test signal will not transmit from antenna 12 and prevent the possibility of energizing other equipment. The receiving portion of the transponder equipment 42 processes the simulated signal and the interrogation network therein generates a signal in the form of a coded pulse train which is transmitted by antenna 12. A detection circuit 95 detects the reply code signal received at probe 13, and conducts the signal to a pulse discrimination circuit 96. If the pulse discrimination circuit 96 detects the appropriate time interval between pulses in the code pulse train, an output signal is applied to the coincidence detector circuit 97. The coincidence detector circuit 97 being energized for a limited length of time, controlled by test control selector 35, then applies a signal to test indicator means 50. If any one component within the entire transponder system is non-operational, the indicator means 50 will not receive a signal.

A fifth specific embodiment of this invention, illustrated in FIG. 6, is the self-test system for the marker beacon system 43, and comprises a self-test unit 26, a local control unit 27, and an antenna test probe 13. The self-test unit is designed to simulate the functions performed by the ground stations, more particularly, to amplitude modulate a carrier frequency with three different frequencies to check out the receiver portion of the marker beacon system.

To test the marker beacon equipment 43, test control selector 51 is placed in the test position, and power is applied to the marker beacon self-test unit 26. The test control selector 51 is designed to activate oscillators 61, 62, and 63 individually, not together. For example, the test control selector 51 may be three individual switches or a multiposition switch. The output signal from oscillator 61 amplitude modulates the carrier signal generated in oscillator 64. This amplitude modulated signal is then transmitted from the test probe 13 to antenna 12 and conducted through conducting wire 15 to the marker beacon system 43. The carrier frequency signal is removed in the receiver section, and the frequency of the remaining signal, equivalent to that of oscillator 61, is passed through one of three band pass filters and causes an appropriate indicator lamp to light up on the panel unit of the beacon system 43. Next, the output signal from oscillators 62 and 63 individually modulate the oscillator signal of unit 64 and are processed by marker beacon system 43 respectively.

The actual frequencies developed by oscillators 61, 62, and 63 are 400, 1,300 and 3,000 Hz respectively. Thus, since each signal is within the audio range, means may be incorporated to provide an audible indication of each of the individual test signals.

The foregoing description has dealt with specific communication and navigational systems. Nevertheless, by using this same principle, any system which transmits and/or receives a signal from an antenna may incorporate this self-test system, and its associated test probe antenna. For example, an aircraft may employ various types of radar systems with each having its own self-test system, or glide-slope receiver systems.

The self-test system would employ an oscillator unit to produce a signal having the same frequency as that normally received by the radar system. In addition, the self-test unit would generate the information which must be contained in the signal received by the radar system, this information being modulated on the oscillator signal. Also, the oscillator circuit would be designed only to operate during the periods when the transmitter section of the radar system is not supplying a signal to the radar antenna, that is, the transmitter on time. This could be done by using appropriate timing signals received from the transmitter section of the radar. Also, the oscillator circuit would have to be protected from the energy contained in the transmitter pulse during normal operation of the system.

The self-test systems set forth hereinabove have been described as discrete components. More particularly, each operational system has its associated self-test and test control units. It is to be understood, however, that the self-test unit and control unit may be designed to be an integral component of the particular avionic system. The function of the self-test unit would be similar to that described hereinabove. Also, all self-test units and control units may be combined into one self-test system wherein one would select the desired test to be performed, and then energize the test control selector. Further, a programmable device may be associated with the test control units, the function of which would be to activate both the self-test unit and its associated operational system for test purposes. Also, this device may be designed to automatically test all systems in any given sequence, once the test selector is energized.

It is to be understood that the above-described arrangements are by way of illustration only and that the basic concepts of the self-test system may be used with any other type system which transmits and/or receives a signal containing information required by the associated processing equipment.

Having thus described the invention, what is claimed as new and desired to be secured by Letters Patent is:

1. A system for receiving energy, said system having a first receiver apparatus coupled to an antenna capable of radiating and receiving energy, wherein the improvement comprises:

an antenna test probe capable of radiating and receiving energy, said test probe being positioned in close proximity to said antenna and within the field of radiation of said antenna;

test means adapted to apply a test signal having prearranged information to provide a predictable result to said test probe, said test means comprising a signal generator means arranged to generate a first signal having fixed frequency, a sweep oscillator means arranged to receive said first signal and to generate a second signal which varies in frequency between a third and a fourth frequency, and an oscillator means arranged to generate a fifth signal having a sixth frequency, said oscillator means adapted to receive said second signal and to modulate said fifth signal thereby to generate a seventh signal which varies in frequency between an eighth and ninth frequency, said eight frequency being less and said ninth frequency being greater than the frequency of said fifth signal, and circuit means arranged to couple said seventh signal to said test probe, said first receiver apparatus to receive and process said test signal; and indication means responsive to the processing of said test signal to provide an indication of the predictable result if said first receiver apparatus is functioning properly.

2. A system for receiving energy, said system having a receiver apparatus coupled to an antenna capable of radiating and receiving energy, wherein the improvement comprises:

an antenna test probe capable of radiating and receiving energy, said test probe being positioned in close proximity to said antenna and within the field of radiation of said antenna;

test means arranged to apply a test signal having predetermined information to provide a predictable result to said test probe, said test means comprises a signal generating means arranged to provide a first signal having a first fixed frequency to a variable phase shift means, said phase shift means arranged to vary the phase of said first signal;

a second signal generating means arranged to generate a second signal having a second fixed frequency which is greater than said first fixed frequency, said second signal generating means arranged to receive said first signal from said phase shifter and modulate said second signal thereby, the phase difference between said first signal and said second signal providing compass directional information, means for combining said second signal with said first signal; and a third signal generating means capable of producing a third signal having a third frequency greater than said first or second frequency, said third signal generating means arranged to receive said combined signal and modulate said third signal thereby and apply said modulated signal to said test probe, said modulated signal being said test signal, and said receiver apparatus to receive and process said test signal; and indication means responsive to the processing of said test signal to provide an indication of said predetermined compass directional information if said receiver apparatus is functioning properly.

3. A system for transmitting and receiving energy for measuring the distance between the transmitting source and a fixed reference station, said system having a first transmitter apparatus and first receiver apparatus with said transmitter means arranged to transmit an r-f carrier signal modulated by a first signal having prearranged pulse pattern formation from an antenna to a remote ground station and said receiver means arranged to receive and process said first signal retransmitted from said ground station, said receiver means capable of measuring the time elapsed from the transmission to the reception of said first signal thereby providing an indication of the distance, said first transmitter and first receiver apparatus coupled to an antenna capable of radiating and receiving energy, wherein the improvement comprises:

an antenna test probe capable of radiating and receiving energy; said test probe being positioned in close proximity to said antenna and within the field of radiation of said antenna;

test means arranged to receive said r-f carrier modulated signal from said test probe, said test means having means to detect said first signal with said prearranged pulse pattern, said detector means being arranged to couple said first signal to discrimination circuit means, said discrimination circuit means being arranged to couple said first signal if said first signal comprises the prearranged pulse pattern formation to a delay means, said delay means couples said first signal to a signal generating means after a predetermined length of time, said signal means generating means having a frequency equal to the r-f carrier frequency, said signal generating means combining said first signal with said carrier frequency signal, said signal generating means arranged to couple said combined signal to said distance measuring receiver means for processing; and indication means responsive to the processing of said combined signal to provide an indication of said predetermined delay of said test means if said distance measuring means is functioning properly.

4. A system for transmitting and receiving energy, said system having a first transmitter and a first receiver apparatus coupled to an antenna capable of radiating and receiving energy, wherein the improvement comprises:

an antenna test probe capable of radiating and receiving energy, said test probe being positioned in close proximity to said antenna and within the field of radiation of said antenna;

a test system coupled to said test probe, said test system having means to produce a first signal having a series of pulses, said first signal being coupled to a signal delay means, said delay means being constructed so as to arrange said series of pulses in a predetermined time relationship, signal generator means arranged to produce a second signal having a frequency equal to the r-f carrier frequency of a transponder apparatus, said signal generator means so constructed as to modulate said second signal with said first signal from said delay line, means for coupling said modulated signal to said transponder apparatus for processing;

said transponder apparatus comprising transmitter and receiver means, said receiver means arranged to receive said modulated signal and to generate a response signal having a series of pulses, the time relationship between said pulses being determined by the time relationship between the pulses of said first signal from said delay line, said transponder receiving means arranged to couple said response signal to said transponder transmitting means for transmission from said antenna, said test system arranged to receive said response signal from said test probe, said test system further comprising signal detection means coupled to said antenna test probe, said detection means so constructed as to produce a series of pulses separated by a time relationship equal to the time relationship present in said transponder response signal, and discrimination circuit means arranged to receive said series of pulses, said discrimination means so constructed as to produce an output signal if the predetermined time relationship between the pulses of said response signal is present; and indication means responsive to the processing of said response signal having a series of pulses if said transponder apparatus is functioning properly.

* * * * *